S. B. BUCK.
Corn Planter.

No. 100,495. Patented March 8, 1870.

Witnesses.
J. H. Burridge
D. S. Humphrey

Inventor.
S. B. Buck

United States Patent Office.

S. B. BUCK, OF ELYRIA, OHIO.

Letters Patent No. 100,495, dated March 8, 1870.

IMPROVEMENT IN CORN-PLANTERS.

The Schedule referred to in these Letters Patent and making part of the same

*To all whom it may concern:*

Be it known that I, S. B. BUCK, of Elyria, county of Lorain, and State of Ohio, have invented a certain new and improved Corn-Planter; and I do hereby declare that the following is a full, clear, and complete description of the same, reference being had to the accompanying drawings making part of this specification, in which drawings—

Figure 1:
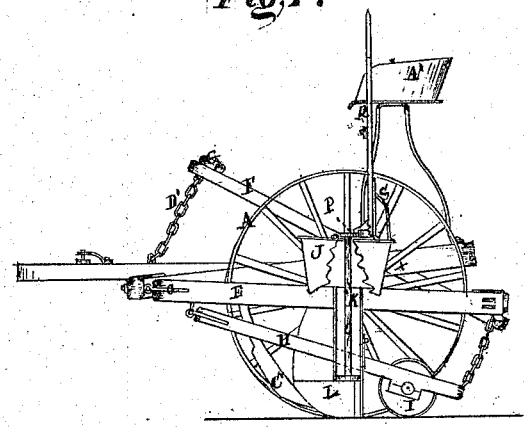
Figure 2:
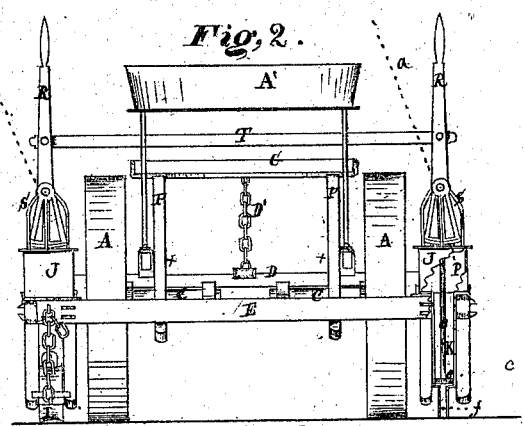
Figure 4:
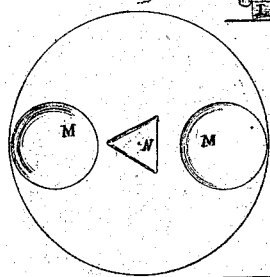
Figure 3:
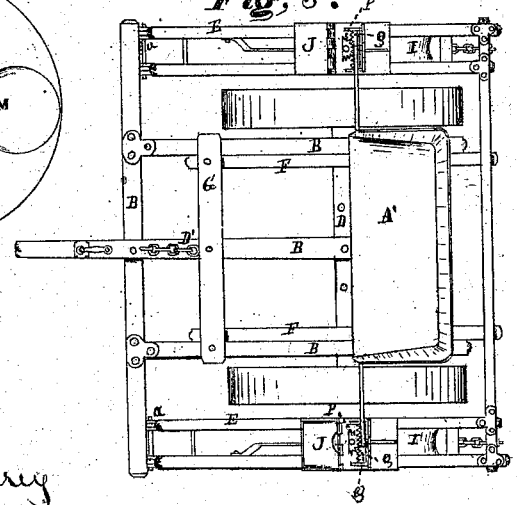
Figure 5:
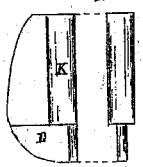

Figure 1 is a side view of the planter.
Figure 2, a view of the rear end.
Figure 3, a top view.
Figures 4 and 5, detached sections.
Like letters of reference refer to like parts.

Objective.

This invention relates to a machine for planting corn by means of vibrating disks operated by certain pinions and segmental gear, whereby the seed is allowed to fall from the seed-boxes through conductors and furrow-blades or shares to the ground, and covered by rollers, as hereinafter more fully described.

General Description.

In fig. 2—

A represents a pair of wheels, on which is mounted a frame, B.

It will be observed that each wheel has its own axle, C, fig. 2, to which it is secured in a rigid manner. Said axles are attached to the under side of the cross-bar D, (part of the frame B,) in appropriate journal-boxes.

By this separate and independent arrangement of the wheels, the machine can be turned about without any dragging of the wheels.

To the front bar of the frame B is attached an auxiliary frame, E, by means of the hinges $a$, whereby said frame may be raised or lowered by means of the levers F, pivoted to the frame at the points $x$, fig. 1, and connected to each other by the bar G, whereby the levers are simultaneously operated by the feet of the operator, for a purpose hereinafter shown.

To the under side of each end of the frame E is hinged, at the point $b$, a frame, H, fig. 1, in the rear or free end of which is journaled a grooved-faced roller, I, fig. 3.

On the outside of the wheels, on the frame E, are secured the seed-boxes J, to the bottom of which, and communicating with the inside thereof, is connected a conductor, K, a detached side view of which is shown in fig. 5.

To the lower end of the conductor is attached a furrow-blade or share, L, into and through which the seed is dropped to the ground.

In the lower end of the conducting-tube is a disk, $c$, a portion of the tube being broken away in order that it may be seen. An enlarged view of said disk is shown in fig. 4.

In said disks are seed-cups or holes M, having a capacity of about four or five grains.

In the center of the disk is a triangular hole, N, into which is inserted the lower end of the shaft O, passing upward through the tube and box, thence through the top thereof to the outside.

To the upper end of the shaft is secured a pinion-wheel, P, fig. 3, whereby said shaft and disk are made to oscillate by means of the segmental gear Q with which it engages, the segment being operated by the lever R, fig. 2, to which it is attached. Said lever is pivoted to the stay S, secured to the top of the box, as shown in fig. 1.

Each box is alike provided with a conducting-tube, disk, shaft, gearing, and levers, the levers being connected to each other by a link, T, whereby they are actuated conjointly and at the same instant.

Operation.

Having thus described the construction and arrangement of the planter, the practical operation of the same is as follows, viz:

The seed-boxes being filled with corn, the machine is placed in the line of work. The operator takes his place on the seat A', grasping in his hand one of the levers, R. At the proper time, on moving the levers in direction of the dotted line $a$, the segment gear thereto attached will cause the shaft to turn, and bring one of the cups M over the opening $f$ in fig. 2, in the bottom of the conductor, through which the seed will drop into the furrow plowed by the share L, which is immediately covered by the grooved rollers I, following directly in the rear. As the machine moves forward, and arrives at the next place for dropping the grain, a reverse action of the lever will bring the opposite cup, now filled with corn, in open relation to the opening $f$ of the tube, through which it falls to the ground, and is covered in like manner and so on; throughout the length of the field or number of rows therein, each alternate movement brings a filled seed-cup in each of the boxes in open relation to a corresponding hole in the bottom of the conductor, thereby planting two rows at once. More seed than that held in each cup is prevented from falling through from the box by means of a rubber check, $b$, attached to one side of the tube immediately above the opening in the bottom, and under which the cup holding the grain passes to come in open relation therewith; hence a regular and uniform number of grains of corn are dropped at each time from each of the boxes.

Should there be stubble or other like obstruction in the way of the furrow-share, a colter, O', fig. 1, cuts it away, so that the share will run freely for making the furrow, the depth of which being regulated by raising or lowering the auxiliary frame E, by means of the levers F, or the frame, with its adjuncts, may be raised so far above the ground as to pass over obstructions, or for moving the machine from place to place. In such elevated position it is held by the chain D'.

It will be observed that the seed-boxes and conductors are placed in the axial line of the wheels, instead of being in advance or in the rear of said line, the purpose of which is to allow the furrow-share to run in uneven ground; thus, as the wheels may run into a hollow, the shares will go with them, and make a furrow, the same as they would do on a flat, smooth surface, which would not be the case were the furrow-shares placed either in front or in the rear of the axial line of the wheels, for in that event the wheels and the pole of the machine, supported by the neck-yoke, would prevent the shares from dropping into the hollows, and in consequence would make no furrow, but drop the corn upon the top of the ground.

*Claims.*

What I claim as my invention, and desire to secure by Letters Patent, is—

1. The frame B, hinged to the adjustable frames H E, roller I, and levers F, when combined and arranged to operate in the manner substantially as described and for the purpose set forth.

2. The seed-boxes J, conductors K, and furrow-shares or blades L, in combination with the hinged adjustable frame E, and arranged in relation to the axial line of the wheels A, substantially in the manner as described and for the purpose set forth.

3. The disks C, shafts O, pinions P, segmental gear Q, levers R, and conductors K, all combined and arranged to operate in the manner as described and for the purpose specified.

S. B. BUCK.

Witnesses:
J. H. BURRIDGE,
D. L. HUMPHREY.